May 26, 1942.   H. R. NUCKLES   2,284,340
PACKING
Filed April 13, 1940
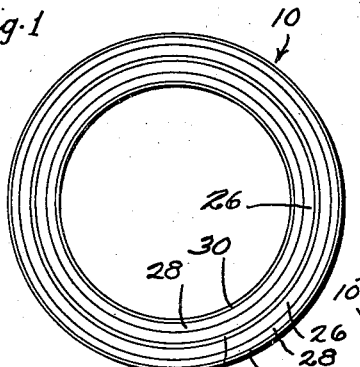
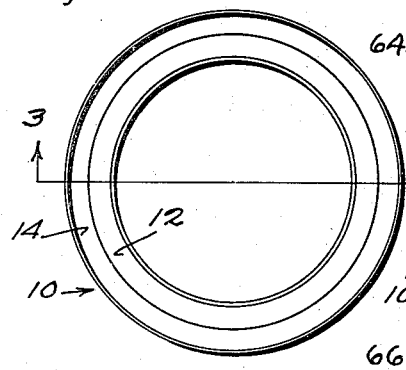
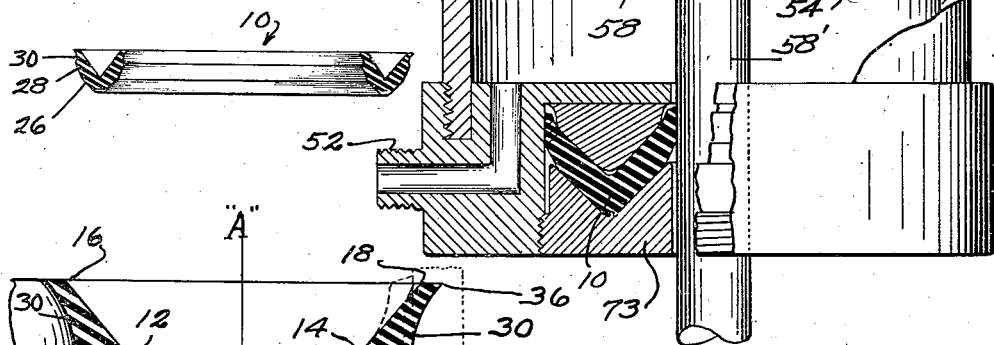
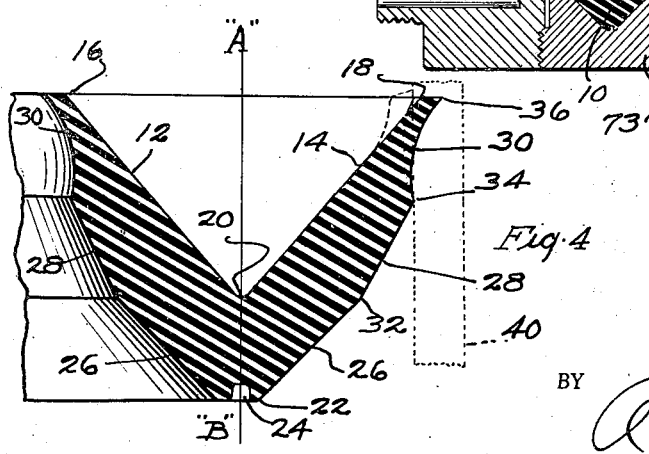
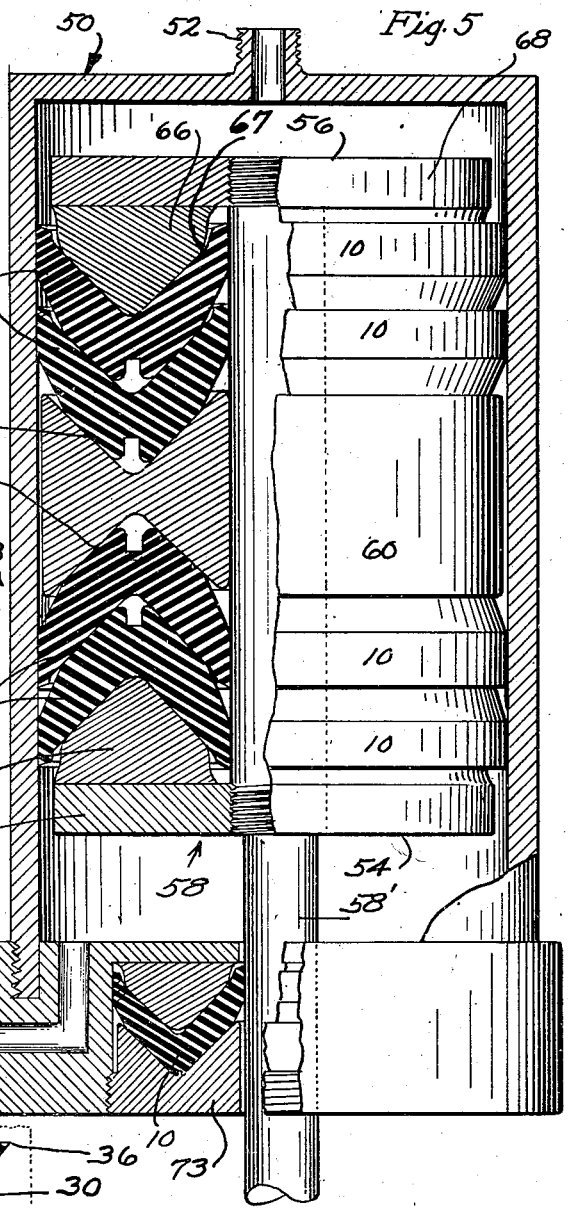
INVENTOR.
H. Ray Nuckles
BY Patented May 26, 1942

2,284,340

UNITED STATES PATENT OFFICE 2,284,340

PACKING

Herman Ray Nuckles, La Crescenta, Calif.

Application April 13, 1940, Serial No. 329,518

11 Claims. (Cl. 309—4)

The packing of this invention is adapted to be used to form a seal to prevent or definitely limit passage of fluid, vapors, or gas around a point to be sealed against such passage, and superior results are obtained when used in units of two or more individual rings.

Numerous means have been resorted to, to effect the sealing of fluid and the like when under pressure, including steel and rubber or other rings, wicking, etc., however, all of the above types of packing while having certain merits, also have limitations in that they are poorly suited to seal against low pressure, which result is obtained by use of the packing of this invention, for the reason that the wall of the individual packing rings are configured to be sprung inwardly when placed in operative position, and the tension thus created, together with pressure within the cylinder regardless of its degree, causes the marginal feather-edged portion of the ring to effectively seal a piston or analogous device without undue pressure or frictional drag.

A further object of the invention is to provide a packing ring having a section of the wall thereof, so formed as to be inwardly springable in a constant radius when installed in a cylinder, whereby the portion thus sprung will be under natural tension and will exert pressure upon the cylinder wall at all times regardless of fluid pressure working in the cylinder.

Another object of the invention is to provide a packing ring having a wall section provided with a feather-edged portion, and other sections of varied sectional thickness whereby bands having different angular faces extend around the ring so that one of the bands or sections including the feather-edged portion will be sprung inwardly in a constant radius when installed in a cylinder whereby the sprung portion and the feather-edged portion associated therewith will be under natural tension and will exert pressure upon the walls of a cylinder at all times regardless of pressure working within the cylinder.

Still another object of the invention is to provide a packing comprised of a plural number of separate packing rings adapted to be nested together, each ring being formed with an annular feather-edged portion and having other portions thereof of increased thickness, said last mentioned portions being in the form of angular faces which extend in bands around each of the rings, so that when the rings are nested one ring will have its portion of less sectional diameter sprung around a point of intersection of the faces of another ring so that tension inherent in the ring will cause the portion so sprung and including the feather-edged portion to exert an outwardly applied pressure upon the cylinder walls within which the packing is positioned regardless of pressure within the cylinder.

A still further object of the invention is to provide a packing which is pliant and which readily responds to the configuration of the chamber within which it operates whereby a more universally applicable packing is had.

Another object of the invention is to provide a packing which is of simple construction and of low cost, and which is readily installed, and long lived, yet concurrently maintaining a standard of efficiency.

And still another object of the invention is to provide a packing comprising a plural number of separate packing rings adapted to be nested together, each ring being formed with an annular feather-edged portion and having other contiguous portions thereof of increased sectional thickness said last mentioned portions being in the form of angular faces which extend in bands around each of the rings so that the intersection of two of said faces will form a point of fulcrum for the portion carrying the said feather-edge so that the feather-edged portion will be sprung around said fulcrum point and hence will be under inherent tension which exerts an outward pressure upon the cylinder in which the packing is installed regardless of pressure working within the said cylinder.

Other objects, features and advantages of the invention may be apparent from the accompanying drawing, the specification, and the subjoined claims.

In the drawing of which there is one sheet:

Figure 1 is a plan view of the convex side of the packing ring of this invention.

Figure 2 is a plan view of the concave side of the packing ring.

Figure 3 is a sectional elevation taken on line 3—3, in Figure 2 showing the appearance of the packing ring previously described.

Figure 4 is an enlarged sectional view showing in particular the concaved recess formed in the packing ring for the purpose of more effectively forming a seal upon the surface with which it is relatively movable.

Figure 5 is a view partially in section and partially in elevation showing a piston assembly employing the packing ring of this invention.

As shown in the several figures of the drawing, the packing ring of this invention comprises an annular ring 10 of substantially V shaped cross-section. As shown, particularly in Figures 3 and 4, the concaved portion of the packing ring is formed with flat tapered sides 12 and 14 beginning at points 16 and 18 and converging at point 20.

The exterior or convex side of the ring 10, beginning substantially at point 22, adjacent the annular groove 24, is formed with a plural number of differently inclined surfaces 26, 28, and 30.

Of these faces, face 26 is substantially parallel with its complementary face 12 or 14 upon the inner side of the ring, and these faces are spaced apart in a degree sufficient to give the ring an amount of rigidity in the section therebetween. The face 28 which lies between points 32 and 34 extends more sharply in a vertical angle so that the section between the face 28 and its complementary portion of the faces 12 or 14 is tapered, thereby tending to give the ring a considerable degree of flexibility across this section. Beginning at point 34 and extending to the feather-edged point 36, the face 30 is concaved to accentuate the stated feather-edged point (annular) 36 which of course limits the concavity in its one extreme, and this edge lies further removed from the medial vertical center "A—B" than any other of the mentioned points.

In Figure 4, the dotted lines 40 indicate a section of a cylinder wall within which the ring is to be placed, and as shown, the point 36 would be projected or would naturally extend into a part of the space occupied by the wall of the cylinder, however, in placing the ring in position, that section of the ring which comprises faces 28 and 30, and points 34 and 36 are naturally bent inwardly, being sprung around the shoulder or fulcrum point 32 of the ring nested within the ring concerned (see Figure 5). Usually a plural number of nested rings, or cups as they are sometimes called, forms a standard installation, hence it will be seen that each of the nested rings provides a fulcrum point about which that portion of the ring having the least section thickness is sprung or rotates, thereby creating a relatively sharp bend which develops natural tension inherent in the ring and hence the feather-edged portion is firmly urged or forced into contact with the wall of the cylinder for sealing purposes, and this action it is to be noted is independent of pressure within the cylinder which is frequently used to force the ring into contact with cylinder walls.

In Figure 5, I show an application of the packing ring of this invention, here a cylinder 50 having points 52 for threadedly receiving pipes (not shown) to conduct fluid under pressure to opposing faces 54 and 56 of piston 58, which in the present instance may be considered as being in static balance, although of course such condition need not prevail, and is thus shown only for purposes of illustration.

In developing the construction shown in Figure 5, the piston rod 58' is provided with a female adaptor or ring 60 which is formed with grooves 62 and 64 in the upper and lower faces thereof. Any required number of packing rings 10 are then fitted in nested relation with the tapered portion thereof in the grooves 62 and 64 as shown, thereafter, male adaptors or rings 66 are placed with the tapered portion thereof in the concave portion of the rings of this invention, as shown.

Heading discs or plates 68 and 70 are then screwed upon the threaded portion of the piston rod 58' to retain the rings 66 in functional position, yet retaining a relatively loose relationship between the rings 10 to permit them to adjust themselve to the conditions prevailing in the cylinder.

A packing ring or a plural number thereof of the character herein contemplated may be effectively used in the gland 73 to seal the piston rod 58' in its travel in and out of the cylinder 50. Further elaboration thereon is scarcely needed for the utility thereof is clearly shown.

From the preceding discussion it is believed that it will be readily apparent that a simple, highly efficient and relatively low cost piston assembly follows use of the packing ring of this invention, which is capable of absorbing sudden and violent shock.

The essence of the invention as will have been previously observed, resides in providing the ring with a section of reduced dimension and having the top edge of the section reduced to as sharp a point as practical, and then having this reduced section so positioned with respect to a fulcrum point as to be rotatable thereover, and such fulcrum point may and usually is provided by nested ring 10 in co-operation therewith, but it also could be provided by a fitting secured upon the piston if a single ring 10 were used as a seal. Such a fulcrum point being provided at 67 in the ring 66 to accommodate the uppermost of the rings 10 which would otherwise be without such facility. Rotation or bending of the reduced section around the fulcrum point at 32 or 67 develops inherent material tension and accordingly in an effort to effect re-adjustment, pressure is created upon the cylinder wall which enables the feather-edged portion 36 to effectively remove fluid from the walls of the cylinder, while the whole of the flattened face 30 affords sufficient area to ensure long lived action and an effective seal against passage of fluid.

In conclusion, it may be stated that various changes and modifications of the invention may be effected in practicing the invention in departure from the drawing and description as given, without however, departing from the true spirit of the invention as defined by the scope of the appended claims, accordingly, any variation thereof which falls within the scope of the claims is to be considered a part of the present invention.

I claim:

1. A rubber packing ring formed as a moulded product and having a substantially V shaped section, the exterior of said section having a plural number of faces in concentric bands and being so positioned with respect to a medial vertical line drawn through said section that the walls of the section converge into a substantially feathered edge, one of said faces being concaved whereby the same will readily yield to conform with and effect an increase in wall surface contact.

2. A packing adapted to form a seal for a piston operating in a cylinder, said packing being formed of a plural number of individual rings of like configuration, including a feather-edged portion and being adapted to be nested when in functional position, one integral section of said rings being of minimum sectional thickness whereby when in nested relation with another and like ring in a cylinder of less diameter than the diameter of the ring, said minimum section will be fulcrumed upon a point of intersection of other integral sections of said rings of increased sectional thickness whereby natural tension of the material in the ring will cause said feather-edged portion to firmly press against the wall of said cylinder without regard to pressure within the said cylinder.

3. A packing adapted to form a seal for a piston operating in a cylinder, said packing being formed of a plural number of individual rings of like configuration including a feather-edged portion, and having on the outer side thereof a number of horizontally disposed bands certain of which intersect to form a fulcrum point, and another of said bands being concaved to undercut said feather-edged portion and to create a zone of marked sectional reduction, said rings being adapted to be in nested relation with a second and like ring whereby when in a cylinder of less diameter than the diameter of the ring, said reduced zone will be inwardly sprung upon said fulcrum point to increase natural tension of the material comprising the ring to more forcibly press said feather-edged portion against the wall of said cylinder.

4. A packing including two annular juxtapositioned co-axial packing elements of yieldable material and of equal diameter, each of said packing elements having edge portions across their section so configured as to be sprung inwardly in a constant radius when placed in functional position whereby a constant and increased cylinder wall adhesion is created.

5. A packing for cylinders including two annular juxtapositioned co-axial packing elements of yieldable material and of equal diameter, each of said packing elements having a feather edged section, and other sections, said other sections being contiguous and intersecting and having greater sectional dimension so that when in functional position in a cylinder said feather edged section of one of the packing elements will be sprung inwardly around the point of intersection of the contiguous greater sections thereof to effect cylinder wall contact.

6. A packing for cylinders including two nested annular co-axial packing elements of yieldable material and having substantially equal structural characteristics, each of said packing elements having a feather edged section, and other sections integral therewith and comprising the greater part of the packing element, the exterior of said last mentioned sections extending in different angles with respect to a horizontal plane drawn across the base of the element whereby an annular shoulder is formed upon the packing elements, said shoulder forming a fulcrum point over which said feather edged section of the other of the packing elements is springable when placed within a cylinder.

7. A packing for cylinders including two nested annular co-axial packing elements of yieldable material and having substantially equal structural and physical characteristics, each of said packing elements having a feather edged section, and other sections, said last mentioned sections being integral with the feather edged section and comprising the greater part of the packing element, the exterior of said greater sections extending in divergent angles with respect to a horizontal plane drawn parallel with the base of the packing element whereby an annular shoulder is formed upon the exterior of the packing element, the diameter across the stated shoulder of the packing element being definitive of the diameter of the cylinder, and forming a fulcrum point over which the feather edged section of the other of the packing elements is deformable to exert pressure upon a cylinder wall by reaction to said deformation.

8. A packing annulus for sealing a cylinder-piston assembly against escape of pressure fluid, said packing comprising a plural number of nested co-axial elements formed of yieldable material having substantially identical structural and physical characteristics, said elements being formed with relatively heavy V shaped body portions adapted to be piled in superposed physical contact and having interior and exterior concaved face portions in their sections, said face portions extending annularly therefrom to be in pliant floating contact with the wall of the cylinder-piston assembly.

9. A packing annulus for sealing a cylinder-piston assembly against escape of pressure fluid, said packing comprising a plural number of nested co-axial elements formed of yieldable material having substantially identical structural and physical characteristics, said elements having relatively heavy V shaped body portions adapted to be piled in superposed physical contact whereby mechanical clamping pressure may be applied to said packing annuli to secure them in functional position, each of said elements having flexible edge portions extending annularly therefrom in pliant floating contact with the walls of the cylinder-piston assembly with which the packing annuli are associated.

10. A packing annulus for sealing a cylinder-piston assembly against escape of pressure fluid, said packing annulus having a relatively heavy body portion and having a thin pliant concaved lip portion forming an upper and outwardly extending edge of the packing annulus, said concaved lip portion being conformable with a straight line when placed in functional position whereby a sealing surface contact is formed by an outward thrust of lip pressure due to reactance to deformation.

11. A packing annulus for sealing a cylinder-piston assembly against escape of pressure fluid, said packing comprising a plural number of nested co-axial elements formed of yieldable material having substantially identical structural and physical characteristics, said elements having relatively heavy V shaped body portions adapted to be piled in superposed physical contact whereby mechanical clamping pressure may be applied to said packing annuli to secure them in functional position, each of said elements having thin edge portions extending annularly from the outer and inner sides of the section of the annulus, said edge portions being adapted to be in pliant and in relatively floating contact with the surface of the cylinder-piston assembly which is movable relative to the packing annulus.

HERMAN RAY NUCKLES.